United States Patent
Mihm et al.

(10) Patent No.: US 11,235,691 B2
(45) Date of Patent: Feb. 1, 2022

(54) ACTUATING REAR CENTER HEAD RESTRAINT

(71) Applicant: GM Global Technology Operations LLC, Detroit, MI (US)

(72) Inventors: Russell J. Mihm, Beverly Hills, MI (US); Venkata Narasimha R. Cherukuvada, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 16/696,046

(22) Filed: Nov. 26, 2019

(65) Prior Publication Data
US 2021/0155134 A1 May 27, 2021

(51) Int. Cl.
*B60N 2/835* (2018.01)
*B60N 2/829* (2018.01)

(52) U.S. Cl.
CPC ........... *B60N 2/835* (2018.02); *B60N 2/829* (2018.02)

(58) Field of Classification Search
CPC ................................ B60N 2/829; B60N 2/835

USPC ........................................................ 297/410
See application file for complete search history.

(56) References Cited

U.S. PATENT DOCUMENTS

| 4,822,102 A | * | 4/1989 | Duvenkamp | .......... | B60N 2/874 |
| | | | | | 297/410 X |
| 6,270,161 B1 | * | 8/2001 | De Filippo | ............ | B60N 2/838 |
| | | | | | 297/410 X |

* cited by examiner

*Primary Examiner* — Anthony D Barfield
(74) *Attorney, Agent, or Firm* — Vivacqua Crane PLLC

(57) ABSTRACT

A rear-center head restraint system for an automobile vehicle includes a rear seatback of an automobile vehicle. A head restraint assembly is mounted on the rear seatback and is moved between a stowed position and a deployed position. The head restraint assembly includes a forward head restraint portion displaced from the stowed position in an upward direction and in a forward direction with respect to the rear seatback. A rear head restraint portion is positioned rearward of the forward head restraint portion and is displaced in the upward direction as the forward head restraint portion displaces away from the stowed position. At least one headrest post is fixedly positioned within the rear seat back. A release mechanism connected to the at least one headrest post is operated to release the head restraint assembly from the stowed position.

14 Claims, 5 Drawing Sheets

ACTUATING REAR CENTER HEAD RESTRAINT

INTRODUCTION

The present disclosure relates to automobile vehicle seat mounted head restraints.

Automobile vehicles provide seat head restraints to reduce or mitigate against whiplash injury during vehicle accidents. Automobile vehicles may include rear passenger seating accommodating three passengers. Each rear seat passenger is provided with a head restraint which is supported on the seatback of each rear seat. Although outboard head restraints are commonly height adjustable, rear center head restraints are commonly not height adjustable which may position the rear center seat head restraint directly in a vision path of the vehicle operator when using a rearview mirror to view objects behind the automobile vehicle and when the vehicle is backing up. Rear seat head restraints are also commonly difficult to accommodate in vehicles which allow rear seat fold-down, as the head restraints during this operation may contact the front vehicle seats and thereby interfere with rear seat fold-down operation, which affects a final folded angle, producing a surface which is not flat when folded. Rear seat head restraints are therefore commonly removable for this operation however this requires both a temporary stowage position for the removed head restraint as well as a subsequent requirement for the head restraint to be reconnected when the rear seat is returned to its upright position.

Thus, while current vehicle head restraints achieve their intended purpose, there is a need for a new and improved system and method for mounting and operating head restraints used in a rear vehicle seat center position.

SUMMARY

According to several aspects, a rear-center head restraint system for an automobile vehicle includes a rear seatback of an automobile vehicle. A head restraint assembly mounted on the rear seatback is moved between a stowed position and a deployed position. The head restraint assembly includes a forward head restraint portion displaced from the stowed position in an upward direction and in a forward direction with respect to the rear seatback. A rear head restraint portion is displaced in the upward direction as the forward head restraint portion displaces away from the stowed position.

In another aspect of the present disclosure, a release mechanism is operated to release the head restraint assembly from the stowed position. The release mechanism is slidably coupled to at least one headrest post, the at least one headrest post fixed within the rear seatback and partially received within a first sleeve.

In another aspect of the present disclosure, the release mechanism further includes a first biasing member internally received within the first sleeve, the first biasing member contacting an end of the at least one headrest post and oppositely contacting a first guide post.

In another aspect of the present disclosure, the first biasing member defines a coil spring generating a biasing force to displace the head restraint assembly in the upward direction.

In another aspect of the present disclosure, the first guide post is releasably latched using a release member to retain the first biasing member in a compressed condition.

In another aspect of the present disclosure, the release mechanism includes: a second sleeve oriented transverse to the first sleeve and having a second guide post slidably disposed within the second sleeve; and a second biasing member abutting the second guide post and generating a biasing force to displace the head restraint assembly in the forward direction.

In another aspect of the present disclosure, in the stowed position a downward facing lower surface of the forward head restraint portion directly contacts an upward facing surface of the rear seatback.

In another aspect of the present disclosure, in the stowed position the rear head restraint portion contacts the upward facing surface of the rear seatback.

In another aspect of the present disclosure, in the stowed position a forward directed surface of the forward head restraint portion is aligned with a forward-facing surface of the rear seatback.

In another aspect of the present disclosure, a release mechanism is operated to release the head restraint assembly from the stowed position. The release mechanism includes: an electric motor operated to release the head restraint assembly from the stowed position; and a switch actuated to energize the electric motor.

According to several aspects, a rear-center head restraint system for an automobile vehicle includes a rear seatback of an automobile vehicle. A head restraint assembly is mounted on the rear seatback and is moved between a stowed position and a deployed position. The head restraint assembly includes a forward head restraint portion displaced from the stowed position in an upward direction and in a forward direction with respect to the rear seatback. A rear head restraint portion is positioned rearward of the forward head restraint portion and is displaced in the upward direction as the forward head restraint portion displaces away from the stowed position. At least one headrest post is fixedly positioned within the rear seat back. A release mechanism connected to the at least one headrest post is operated to release the head restraint assembly from the stowed position.

In another aspect of the present disclosure, the release mechanism includes: a gear rack connected to the at least one headrest post having first gear teeth; a gear having second gear teeth engaged with the first gear teeth; and an electric motor energized to rotate the gear and thereby to longitudinally displace the at least one headrest post in the upward direction and in an opposite downward direction.

In another aspect of the present disclosure, a horizontally disposed guide post is positioned within the head restraint assembly. A second electric motor is energized to horizontally displace the guide post and thereby to horizontally displace the forward head restraint portion in the forward direction and in an opposite rearward direction.

In another aspect of the present disclosure, a second gear rack is connected to the guide post having gear teeth. A second gear has gear teeth engaged with the gear teeth of the second gear rack. The second gear is rotated by operation of the second electric motor.

In another aspect of the present disclosure, the release mechanism includes: a push-button connected to the release mechanism and actuated to release the head restraint assembly from the stowed position; and a biasing member acting to bias the push-button to an extended position.

In another aspect of the present disclosure, the at least one headrest post defines a first headrest post connected to the release mechanism and a second headrest post connected to the release mechanism.

In another aspect of the present disclosure, a load bearing feature acts to resist movement of forward head restraint portion in a rearward direction due to contact of a head of an occupant with a forward directed surface of the forward head restraint portion during an impact event. The load bearing feature defines a latch pin releasably received in a sleeve of the release mechanism.

According to several aspects, a method for positioning a rear-center head restraint system for an automobile vehicle includes: mounting a head restraint assembly on a rear seatback of an automobile vehicle; moving the head restraint assembly between a stowed position and a deployed position, including: displacing a forward head restraint portion of the head restraint assembly from the stowed position in an upward direction away from the rear seatback; and simultaneously translating the forward head restraint portion in a forward direction with respect to the rear seatback; positioning a rear head restraint portion rearward of the forward head restraint portion and lifting the rear head restraint portion in the upward direction as the forward head restraint portion displaces away from the stowed position; and operating a release mechanism connected to the head restraint assembly to release the head restraint assembly from the stowed position.

In another aspect of the present disclosure, the method further includes: connecting a push-button to the release mechanism; and actuating the push-button defining a single action to release the head restraint assembly from the stowed position.

In another aspect of the present disclosure, the method further includes: providing an electric motor with the release mechanism; energizing the electric motor to release the head restraint assembly from the stowed position; and actuating a switch to energize the electric motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
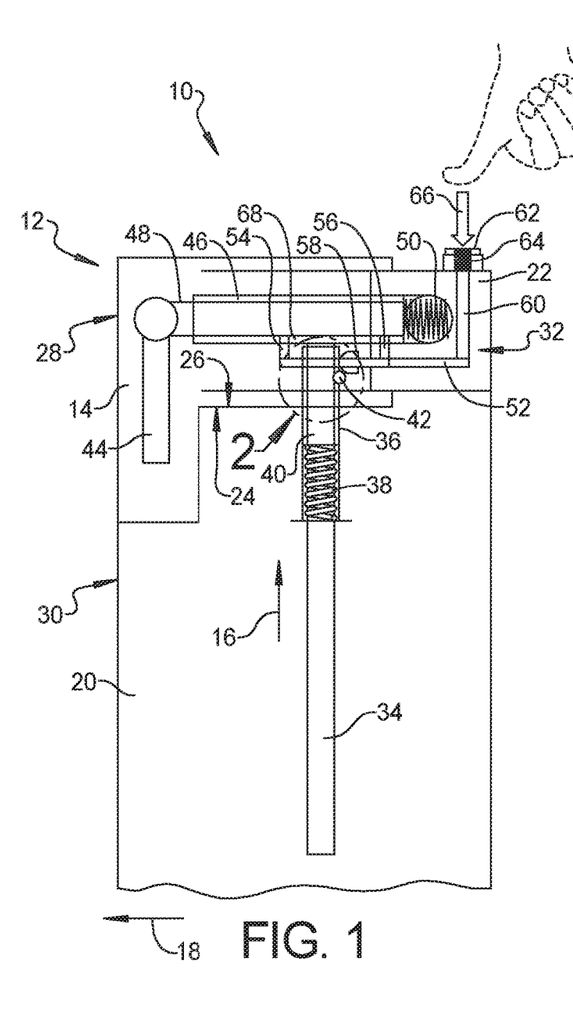
FIG. 1 is a side elevational partial cross-sectional view of a rear-center head restraint system according to an exemplary aspect taken at section 1 of FIG. 3.

Referring to FIG. 1, a rear-center head restraint system 10 for an automobile vehicle includes a head restraint assembly 12 shown in in this view in a non-deployed or stowed position. The head restraint assembly 12 includes a forward head restraint portion 14 which is displaceable in an upward direction 16 and in a forward direction 18 with respect to a rear seat back 20 as shown and described in greater detail in reference to FIG. 4. A rear head restraint portion 22 of the head restraint assembly 12 is displaceable in the upward direction 16 with respect to the rear seat back 20 as, defining "at the same time that" the forward head restraint portion 14 displaces away from the stowed position. In the initial stowed position shown, a downward facing lower surface 24 of the forward head restraint portion 14 directly contacts an upward facing surface 26 of the rear seat back 20 and the rear head restraint portion 22 similarly contacts the upward facing surface 26 of the rear seat back 20. According to several aspects, in the initial stowed position of the head restraint assembly 12 a forward directed surface 28 of the forward head restraint portion 14 may be aligned with, for example co-planar with, a forward-facing surface 30 of the rear seat back 20.

The head restraint assembly 12 also includes a latch-release mechanism 32 which is slidably coupled to at least one headrest post including a first headrest post 34, with a second headrest post not visible in this view. The first headrest post 34 and the second headrest post are mirror image assemblies, therefore the following discussion of the first headrest post 34 applies equally to the second headrest post. The first headrest post 34 is fixed within the rear seat back 20 and is partially received within a first sleeve 36. Also internally received within the first sleeve 36 are a first biasing member 38 which contacts an end of the first headrest post 34 and oppositely contacts a first guide post 40. The first biasing member 38, which according to several aspects defines a coil spring, provides a biasing force to displace the head restraint assembly 12 in the upward direction 16 which is described in greater detail in reference to FIGS. 2 through 4. The first guide post 40 is releasably latched using a release member 42 to retain the first biasing member 38 in a compressed condition shown. According to several aspects, a reinforcement arm 44 is positioned within the forward head restraint portion 14 to maintain a shape of the head restraint portion 14 and to absorb occupant head impact energy.

The latch-release mechanism 32 also includes a second sleeve 46 which is oriented transverse to the first sleeve 36. A second guide post 48 is slidably disposed within the second sleeve 46. The reinforcement arm 44 is fixed to the second guide post 48 and oriented transverse to the second guide post 48. A second biasing member 50, which according to several aspects defines a coil spring, abuts the second guide post 48 and provides a biasing force to displace the head restraint assembly 12 in the forward direction 18 which is described in greater detail in reference to FIGS. 2 through 4. The second guide post 48 is releasably latched using a first release member arm 52 having a first latch pin 54 and a second latch pin 56 to retain the second biasing member 50 in a compressed condition shown. A cam 58 is also fixed to the first release member arm 52.

The head restraint assembly 12 is shown in the stowed position with the first biasing member 38 and the second biasing member 50 in their compressed conditions. A release lever 60 is fixed to the first release member arm 52 and a first push-button 62 is engaged to the first release member arm 52. A third biasing member 64 normally biases the first push-button 62 to an extended position shown. To deploy the head restraint assembly 12 an occupant of the automobile vehicle manually depresses the first push-button 62, compressing the third biasing member 64 and displacing the first release member arm 52, the first latch pin 54 and the second latch pin 56 in a downward direction 66. This downward displacement releases the first latch pin 54 and the second latch pin 56 from within apertures 68 created through the second sleeve 46 and against the second guide post 48. The biasing force of the second biasing member 50 slidably displaces the second guide post 48 and thereby the head restraint assembly 12 in the forward direction 18. According to several aspects the push-buttons are exemplary actuation devices and can be replaced by levers, rocking switches, latch members or similar devices.

As the first release member arm 52 is downwardly displacing the first latch pin 54 and the second latch pin 56, the cam 58 also connected to the first release member arm 52 contacts and displaces the release member 42 to allow the biasing force of the first biasing member 38 to displace the first guide post 40 and thereby the head restraint assembly 12 in the upward direction 16.

Referring to FIG. 2 and again to FIG. 1, the release member 42 is connected to the first guide post 40 and is biased outwardly through an aperture 70 created in the first sleeve 36 which releasably engages the first guide post 40 to the first sleeve 36. The release member 42 may include a dome-shaped or round head 72 which is contacted by the cam 58 when the first release member arm 52 is downwardly displaced. Contact with the release member 42 by the cam 58 compresses a fourth biasing member 74 (only partially shown for clarity) connected to the release member 42 which displaces the release member 42 into the aperture 70 in a direction 75 and into the first sleeve 36, which disengages the first guide post 40 from the first sleeve 36. Disengaging the first guide post 40 allows the first guide post 40 to slidaby displace within the first sleeve 36 using the biasing force created by the first biasing member 38.

Referring to FIG. 3 and again to FIGS. 1 and 2, according to several aspects the latch-release mechanism 32 of the head restraint assembly 12 includes two portions, the first portion described above with respect to FIGS. 1 and 2. The second portion is a mirror image of the first portion and includes a second push button 76 which is manually actuated to contact a second release member arm 78 similar to the first release member arm 52. Displacing the second release member arm 78 releases the compression force of a fifth biasing member 80 which functions similar to the first biasing member 38 and a sixth biasing member 82 which functions similar to the second biasing member 50.

Figure 2:
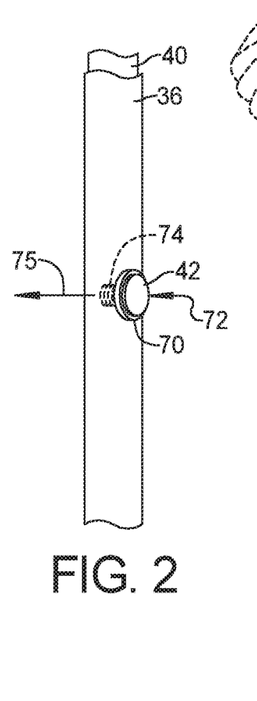
FIG. 2 is a side elevational view of area 2 of FIG. 1.
Figure 3:
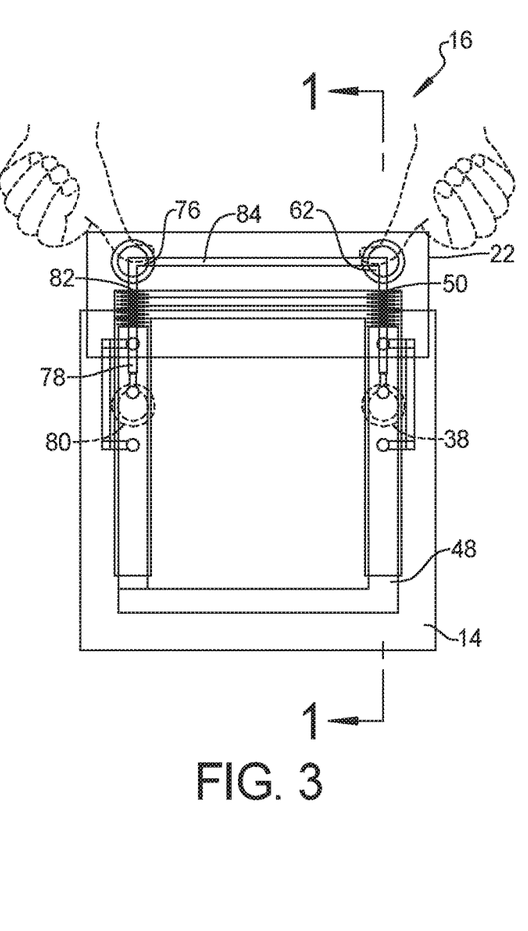
FIG. 3 is a top plan view of the rear-center head restraint system of FIG. 1.

Referring to FIG. 4 and again to FIGS. 2 and 3, the head restraint assembly 12 is shown after displacement to an in-use or fully deployed position. The first biasing member 38 acting on the first guide post 40 displaces the head restraint assembly 12 in the upward direction 16. The second biasing member 50 acting on the second guide post 48 displaces the forward head restraint portion 14 in the forward direction 18. After the first push-button 62 is depressed in the downward direction 66, a seventh biasing member 86 moves the first push-button 62 and the first release member arm 52 in an upward direction 88 opposite to the downward direction 66. A load bearing feature is provided to resist against the forward head restraint portion 14 displacing in a rearward direction 90 due to contact of the head of an occupant with the forward directed surface 28 of the forward head restraint portion 14 during an impact event. The load bearing feature is provided by the first latch pin 54 which is repositioned into the second sleeve 46 during the upward displacement of the first release member arm 52. The first latch pin 54 is contacted by an end wall 92 of the second guide post 48 if the forward head restraint portion 14 displaces in the rearward direction 90.

Figure 4:
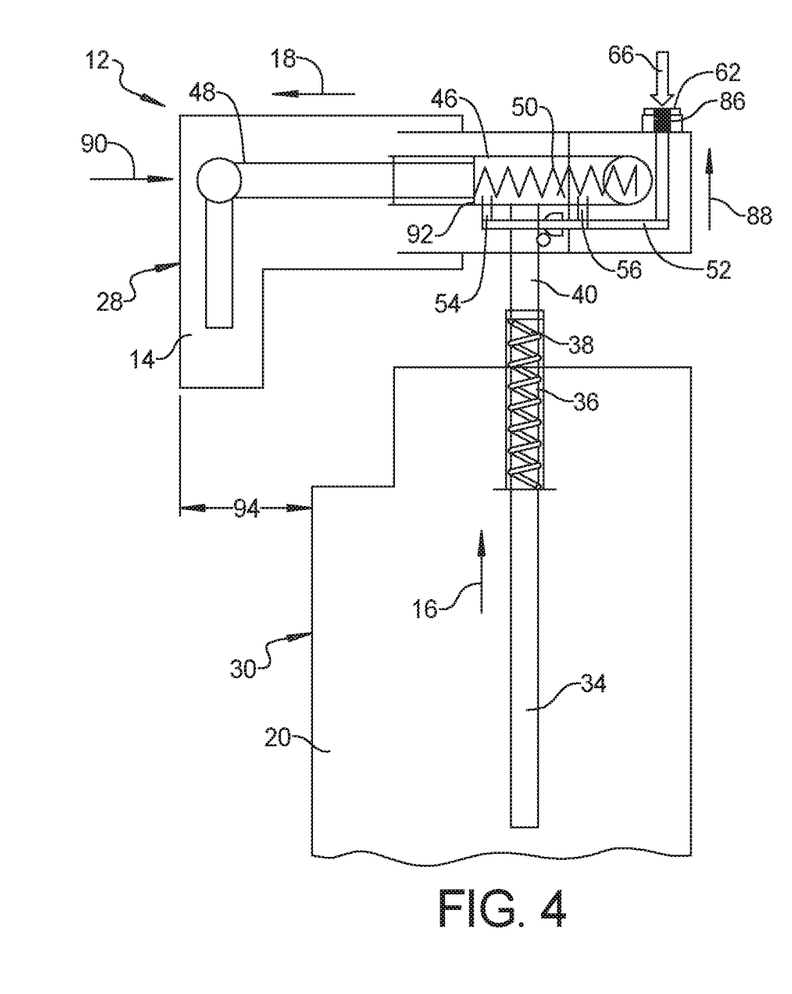
FIG. 4 is a side elevational partial cross-sectional view modified from FIG. 1 to further show a fully deployed position.

When the head restraint assembly 12 reaches the fully deployed position shown, the forward directed surface 28 of the forward head restraint portion 14 is displaced by a displacement dimension 94 forward of the forward-facing surface 30 of the rear seat back 20. According to several aspects the displacement dimension 94 may be approximately 90 mm which positions the forward directed surface 28 approximately 27 mm from a rear head of the seat occupant. The displacement dimension 94 and the spacing from the forward directed surface 28 can vary from the above dimensions and vary between different vehicle designs.

Figure 5:
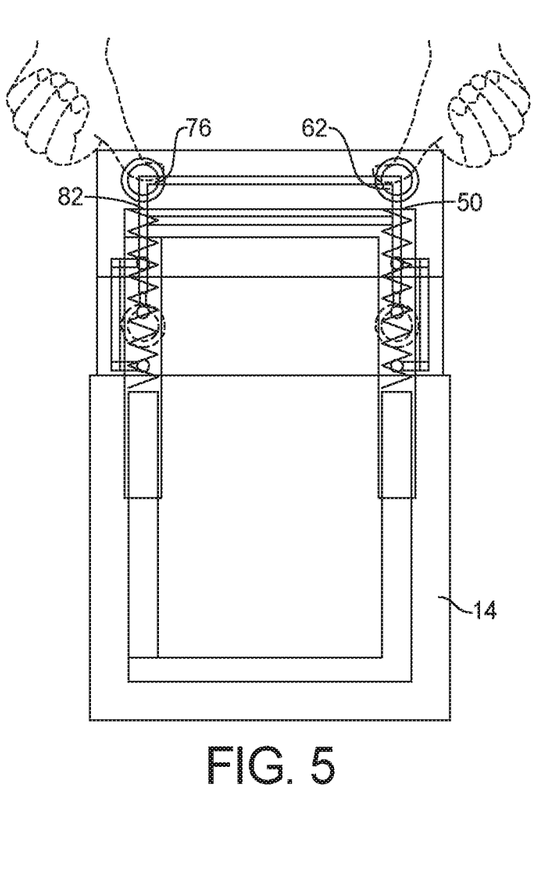
FIG. 5 is a top plan view of the fully deployed position of FIG. 4.

Referring to FIG. 5 and again to FIGS. 1 through 4, when the first push-button 62 and the second push-button 76 are pushed again, the latch-release mechanism 32 allows the forward head restraint portion 14 and the rear head restraint portion 22 of the head restraint assembly 12 to be manually pushed back into its stowed arrangement showed in FIG. 1. The following steps are used for return to the stowed position: Step 1: Push and hold the first push-button 62 and the second push-button 76 (or a lift lever if used in lieu of the push-button(s): Step 2: push the forward head restraint portion 14 in the rearward direction 90 until the forward head restraint portion 14 locks by upward return of the first latch pin 54 and a second latch pin 56, then compress the assembly of the forward head restraint portion 14 in a downward direction, away from the viewer as viewed in FIG. 5.

Referring to FIG. 6 and again to FIGS. 1 through 5, according to further aspects a head restraint assembly 95 provides motorized upward and downward movement of a rear head restraint portion 96 with respect to a rear seat back 98. A latch-release mechanism 100 provides for motion of the rear head restraint portion 96. A first sleeve 102 and a second sleeve 104 are fixed to the rear seat back 98. A first headrest post 106 is slidably disposed within the first sleeve 102 and fixed to the rear head restraint portion 96 and a second headrest post 108 is slidably disposed within the second sleeve 104 and fixed to the rear head restraint portion 96. The latch-release mechanism 100 includes a first gear rack 110 fixed to the first headrest post 106 and a second gear rack 112 fixed to the second headrest post 108. A first gear 114 includes gear teeth 116 engaged with gear teeth 118 of the first gear rack 110 and a second gear 120 includes gear teeth 122 engaged with gear teeth 124 of the second gear rack 112. A shaft 126 connects the first gear 114 to the second gear 120 for common gear rotation. The shaft 126 is axially rotated by operation of a horizontally configured electric motor 128.

Figure 6:
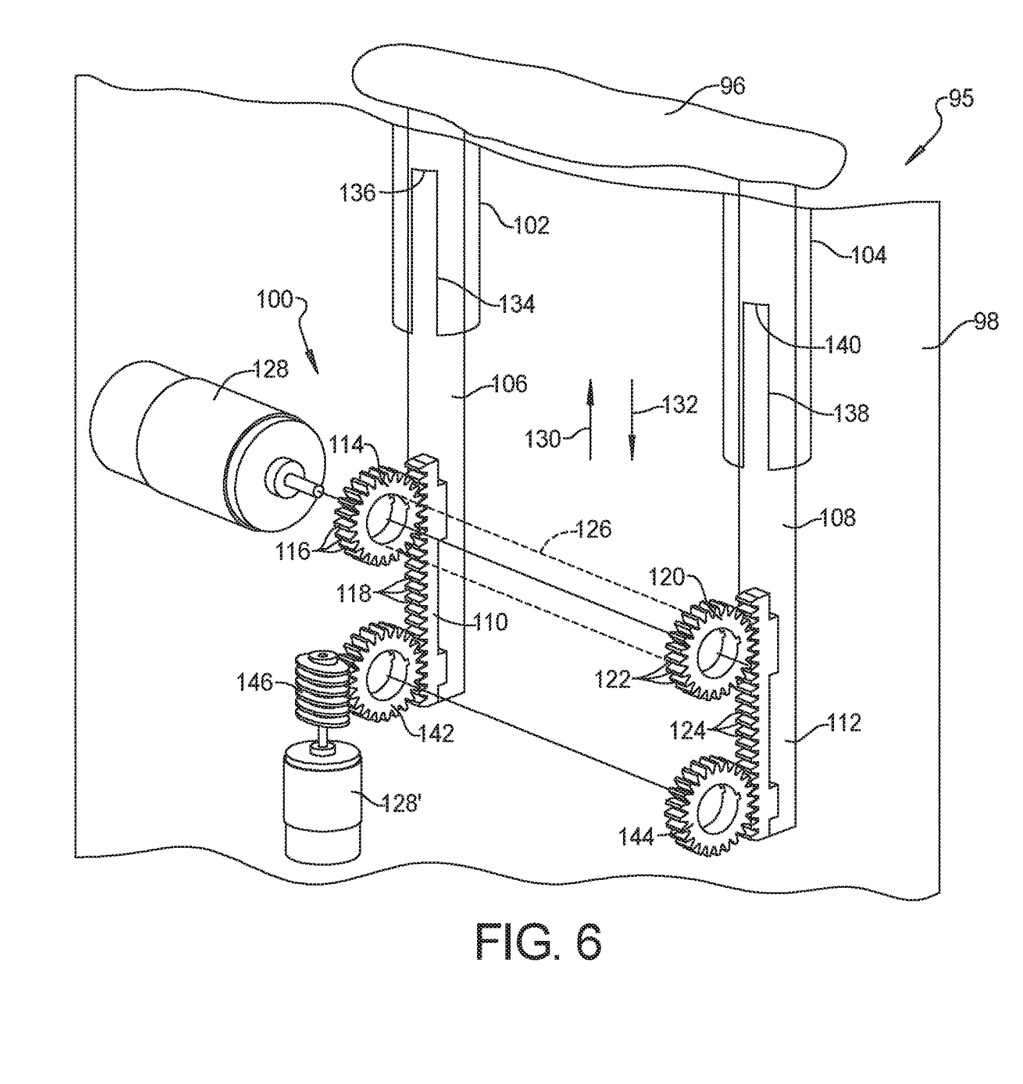
FIG. 6 is a front left perspective view of another aspect of a rear-center head restraint system.

Rotation of the shaft 126 in a first direction of rotation displaces the rear head restraint portion 96 in an upward direction 130 and rotation of the shaft 126 in an opposite second direction of rotation displaces the rear head restraint portion 96 in a downward direction 132. A first slot 134 may be provided in the first sleeve 102 to receive the first gear rack 110 having a first slot end wall 136 defining an upper stop point for travel of the rear head restraint portion 96. Similarly, a second slot 138 may be provided in the second sleeve 104 to receive the second gear rack 112 having a second slot end wall 140 defining an upper stop point for travel of the rear head restraint portion 96.

With continuing reference to FIG. 6, according to further aspects, a gear 142 may be substituted for the first gear 114 and a gear 144 may be substituted for the second gear 120. The gear 142 is adapted to be engaged by a "worm" or helical gear 146 rotated by the electric motor 128 which is vertically configured in this aspect. The helical gear 146 provides load bearing feature such as a frictional positive stop for the rear head restraint portion 96 at any vertical position of the rear head restraint portion 96.

Referring to FIG. 7 and again to FIGS. 1 through 6, according to several aspects the head restraint assembly 95 can be further modified to provide for motorized forward and rearward movement of a forward head restraint portion 148 with respect to the rear seat back 98. The second guide post 48 of the latch-release mechanism 32 may be replaced with a horizontally disposed first motor displaced guide post 150 that includes a gear rack 152 having gear teeth 154 engaged by a gear 156 which is rotated using a helical gear 146 similar to the helical gear 146 previously described above. Rotation of the helical gear 146' displaces the first motor displaced guide post 150 and thereby the forward head restraint portion 148 in opposed forward and rearward directions 158. Interference between the helical gear 146 and the gear 156 when not powered provides a load bearing feature to resist displacement of the forward head restraint portion 148.

Figure 7:
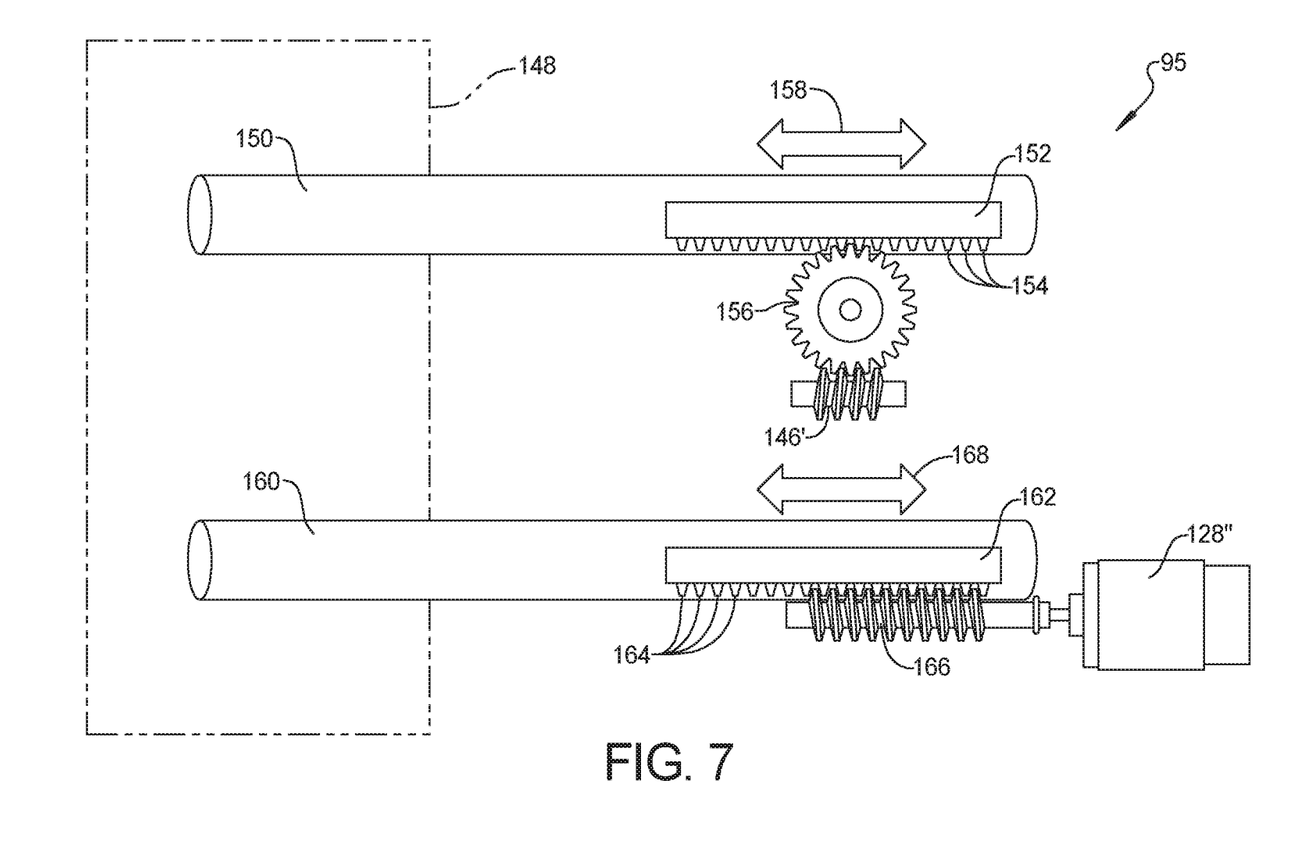
FIG. 7 is a top plan view of further aspects of the rear-center head restraint system of FIG. 6.

With continuing reference to FIG. 7, according to several aspects the first motor displaced guide post 150 may be replaced with a second motor displaced guide post 160 that includes a gear rack 162 having gear teeth 164 engaged by a horizontally threaded gear 166 which is rotated using a horizontally mounted electric motor 128" similar to the electric motor 128 previously described above. Rotation of the horizontally threaded gear 166 displaces the second motor displaced guide post 160 and thereby the forward head restraint portion 148 in opposed forward and rearward directions 168. Interference between the gear teeth 164 and the horizontally threaded gear 166 when not powered provides a load bearing feature to resist displacement of the forward head restraint portion 148.

Figure 8:
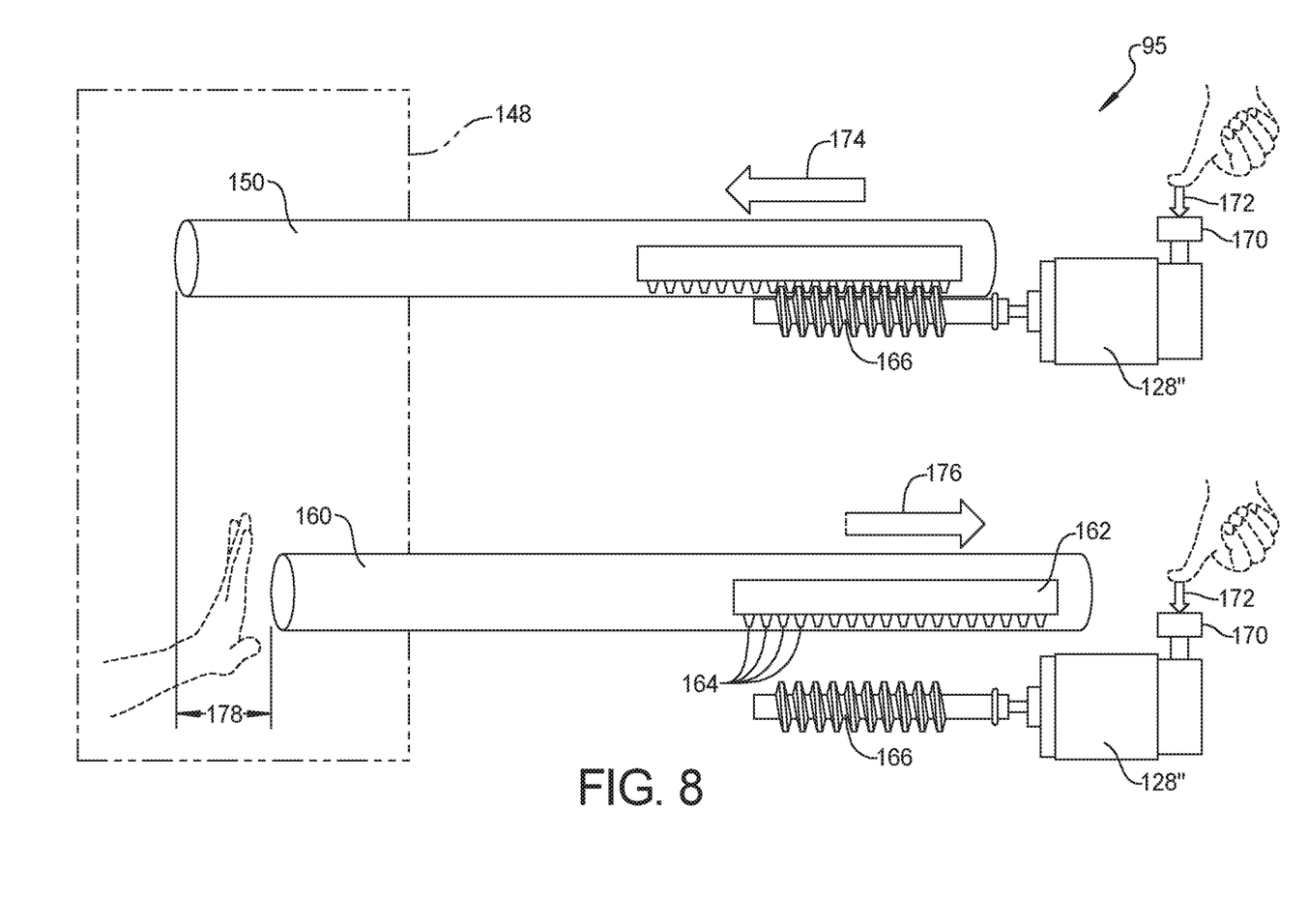
FIG. 8 is a top plan view of further aspects of the rear-center head restraint system of FIG. 7.

Referring to FIG. 8 and again to FIG. 7, the head restraint assembly 95 can be further modified to provide a powered outward displacement of the forward head restraint portion 148. If disengaged as described below, a manual force can then be used to return the forward head restraint portion 148. A release member arm-trigger-switch 170 is partially depressed in a displacement direction 172 to energize the electric motor 128". The horizontally threaded gear 166 is rotated by the electric motor 128" to outwardly displace the forward head restraint portion 148 in a forward direction 174. Once the head restraint assembly 95 is fully up and forward, the release member arm-trigger-switch 170 is further manually displaced in the displacement direction 172 which displaces the horizontally threaded gear 166 away from engagement with the gear teeth 164 of the rack 162. The occupant then manually displaces the forward head restraint portion 148 in a rearward direction 176 opposite to the forward direction 174 to return the forward head restraint portion 148 toward the stowed position. A displacement dimension 178 for displacement of the forward head restraint portion 148 is similar to the displacement dimension 94 of the forward head restraint portion 14 described in reference to FIG. 4.

Several variants of the above described assemblies are also available. These include an electric up-down and fore-aft displacement of a head restraint assembly using a single release actuation action, and a mechanical up-down and fore-aft displacement of a head restraint assembly using a single release actuation action. An electric up-down and fore-aft displacement of a head restraint assembly using a single release actuation action combined with a manual return action may also be provided. While rear center head restraints are herein described, the present disclosure may also apply to head restraints used in any rear seat location of an automobile vehicle, which can include cars, mini-vans, sport utility vehicles, and the like.

A rear-center head restraint system of the present disclosure offers several advantages. These include an actuating and deploying rear center head restraint assembly that ensures the assembly is in an "in-use" position when an occupant manually deploys it to potentially reduce whiplash injury. The rear center head restraint is packaged on the seatback defining an integrated design and achieves the "in-use" position in one actuation or occupant action. The head restraint assembly reaches a minimal backset condition with one button push or actuator operation in any occupant arrangement such as a steep torso angle, or the occupant sitting more forward of an intended point.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rear-center head restraint system for an automobile vehicle, comprising:
   a rear seatback of the automobile vehicle; and
   a head restraint assembly mounted on the rear seatback and moved between a stowed position and a deployed position, the head restraint assembly including:
      a forward head restraint portion displaced from the stowed position in an upward direction and in a forward direction with respect to the rear seatback;
      a rear head restraint portion displaced in the upward direction as the forward head restraint portion displaces away from the stowed position;
      a release mechanism connected to the at least one headrest post and operated to release the head restraint assembly from the stowed position;
      a push-button connected to the release mechanism and actuated to release the head restraint assembly from the stowed position; and
      a biasing member acting to bias the push-button to an extended position.

2. The rear-center head restraint system for the automobile vehicle of claim 1, wherein the release mechanism is slidably coupled to the least one headrest post, the at least one headrest post fixed within the rear seatback and partially received within a first sleeve.

3. The rear-center head restraint system for the automobile vehicle of claim 2, wherein the biasing member is internally received within the first sleeve, the biasing member contacting an end of the at least one headrest post and oppositely contacting a first guide post.

4. The rear-center head restraint system for the automobile vehicle of claim 3, wherein the first biasing member defines a coil spring generating a biasing force to displace the head restraint assembly in the upward direction.

5. The rear-center head restraint system for the automobile vehicle of claim 3, wherein the release mechanism includes:
   a second sleeve oriented transverse to the first sleeve and having a second guide post slidably disposed within the second sleeve; and a second biasing member abutting the second guide post and generating a biasing force to displace the head restraint assembly in the forward direction.

6. The rear-center head restraint system for the automobile vehicle of claim 1, wherein in the stowed position a downward facing lower surface of the forward head restraint portion directly contacts an upward facing surface of the rear seatback.

7. The rear-center head restraint system for the automobile vehicle of claim 6, wherein in the stowed position the rear head restraint portion contacts the upward facing surface of the rear seatback.

8. The rear-center head restraint system for the automobile vehicle of claim 7, wherein in the stowed position a forward directed surface of the forward head restraint portion is aligned with a forward-facing surface of the rear seatback.

9. A rear-center head restraint system for an automobile vehicle, comprising:
- a rear seatback of the automobile vehicle; and
- a head restraint assembly mounted on the rear seatback and moved between a stowed position and a deployed position, the head restraint assembly including:
  - a forward head restraint portion displaced from the stowed position in an upward direction and in a forward direction with respect to the rear seatback;
  - a rear head restraint portion positioned rearward of the forward head restraint portion and displaced in the upward direction as the forward head restraint portion displaces away from the stowed position;
  - at least one headrest post fixedly positioned within the rear seat back;
  - a release mechanism connected to the at least one headrest post and operated to release the head restraint assembly from the stowed position; and
  - a load bearing feature acting to resist movement of forward head restraint portion in a rearward direction due to contact of a head of an occupant with a forward directed surface of the forward head restraint portion during an impact event, the load bearing feature defining a latch pin releasably received in a sleeve of the release mechanism.

10. The rear-center head restraint system for the automobile vehicle of claim 9, wherein the release mechanism includes:
- a gear rack connected to the at least one headrest post having first gear teeth;
- a gear having second gear teeth engaged with the first gear teeth; and
- an electric motor energized to rotate the gear and thereby to longitudinally displace the at least one headrest post in the upward direction and in an opposite downward direction.

11. The rear-center head restraint system for the automobile vehicle of claim 10, further including:
- a guide post horizontally disposed positioned within the head restraint assembly; and
- a second electric motor energized to horizontally displace the guide post and thereby to horizontally displace the forward head restraint portion in the forward direction and in an opposite rearward direction.

12. The rear-center head restraint system for the automobile vehicle of claim 11, further including:
- a second gear rack connected to the guide post having third gear teeth; and
- a second gear having fourth gear teeth engaged with the third gear teeth of the second gear rack, the second gear rotated by operation of the second electric motor.

13. The rear-center head restraint system for the automobile vehicle of claim 9, wherein the release mechanism includes:
- a push-button connected to the release mechanism and actuated to release the head restraint assembly from the stowed position; and
- a biasing member acting to bias the push-button to an extended position.

14. The rear-center head restraint system for the automobile vehicle of claim 13, wherein the at least one headrest post defines a first headrest post connected to the release mechanism and a second headrest post connected to the release mechanism.

* * * * *